United States Patent [19]

Koch

[11] 4,379,569
[45] Apr. 12, 1983

[54] TRAILER HITCH ADAPTOR

[76] Inventor: Richard L. Koch, 314 E. Rovey Ave., Phoenix, Ariz. 85012

[21] Appl. No.: 288,518

[22] Filed: Jul. 30, 1981

[51] Int. Cl.$^3$ .............................................. B60D 1/06
[52] U.S. Cl. ................................ 280/415 A; 280/504; 280/511
[58] Field of Search .............. 280/415 R, 415 A, 417, 280/504, 511, 515

[56] References Cited

U.S. PATENT DOCUMENTS

| | | | |
|---|---|---|---|
| 3,837,674 | 9/1974 | Rathsack | 280/415 A |
| 3,848,893 | 11/1974 | Patterson | 280/415 A |
| 3,963,266 | 6/1976 | Thelin | 280/504 |
| 4,176,852 | 12/1979 | Collin | 280/415 A |

*Primary Examiner*—Joseph F. Peters, Jr.
*Assistant Examiner*—Donn McGiehan
*Attorney, Agent, or Firm*—Don J. Flickinger

[57] ABSTRACT

An adaptor assembly for converting a pintle hook hitch to a ball-and-socket type is disclosed. The assembly comprises a cylindrical bar of sufficient length that is closely received through the eyelet of the pintle hook hitch and a base plate which is affixed along the length of the bar and extends directly therefrom. The base plate includes a first aperture centrally located to accommodate the hook and closure members of the pintle hook and a second aperture spaced near the rear of the base plate to receive the ball member of a ball-and-socket hitch. Threaded bolts are placed through each end section of the bar and are directly threaded through the rear mounting of a towing vehicle to which the pintle hook hitch is mounted.

3 Claims, 4 Drawing Figures

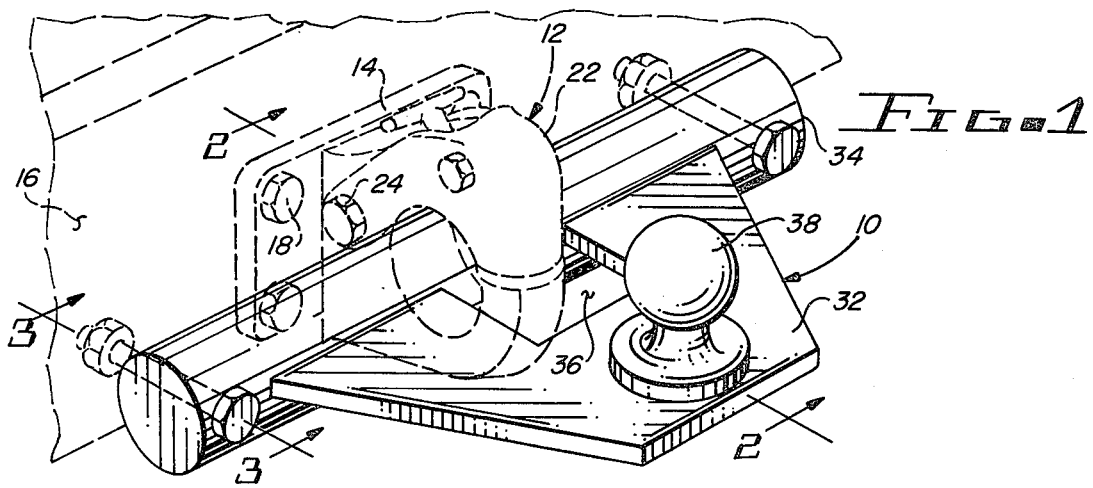
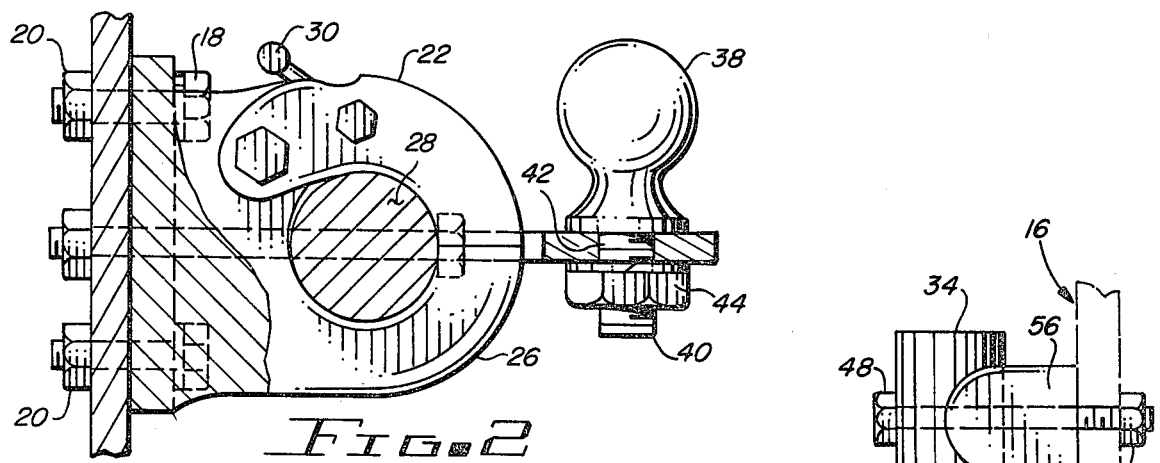
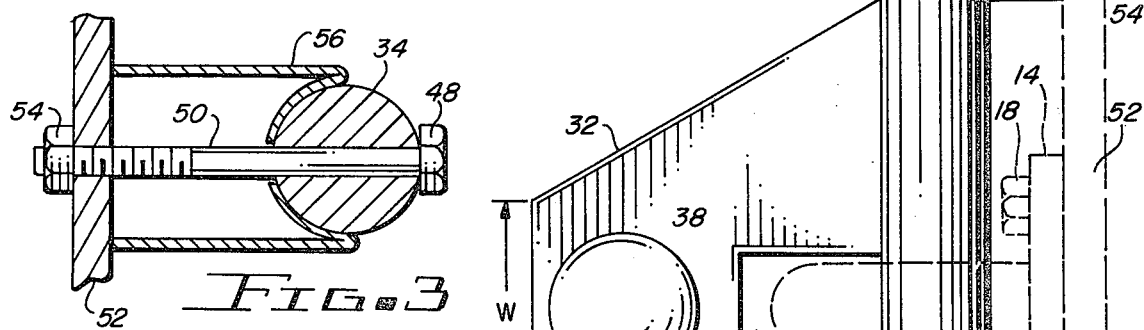
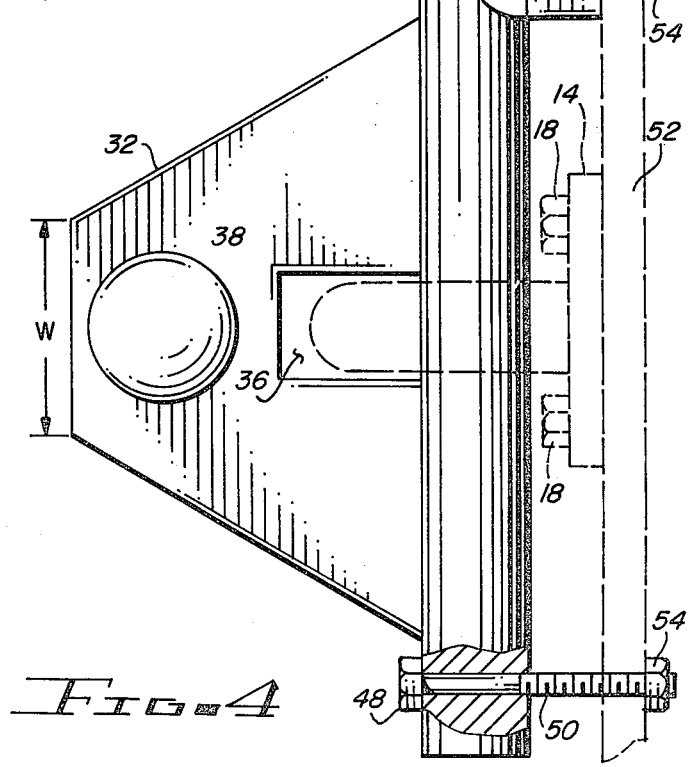

TRAILER HITCH ADAPTOR

BACKGROUND OF THE INVENTION

1. Field of the Invention

The present invention relates generally to trailer hitches. More particularly, the invention relates to a hitch adaptor to convert pintle-type hitches to a ball-and-socket-type.

2. Description of the Prior Art

Trailers and other types of equipment that are arranged to be pulled by a towing vehicle can come equipped with several different types of attachment assemblies. For instance, there are two types of trailer hitches commonly used today: (1) the pintle hook hitch; and (2) the ball-and-socket-type hitch. Generally, the pintle hook is used to tow very heavy equipment whereas the ball-and-socket hitch is utilized with lighter types of trailers and other equipment. The pintle hook, as is generally known, includes a hook attached by a mounting plate to the back of a towing vehicle which engages a ring-eyelet assembly that is attached to the trailer tow bar. A closure member mates with the hook to prevent the ring-eyelet from being disengaged therefrom during towing. In a ball-and-socket hitch, a ball member is typically attached to the rear bumper of the towing vehicle and is clamped into a ball socket that is affixed to the trailer tow bar.

In businesses involving trailer towing, it may be desirous and even necessary to have towing vehicles that accommodate both of the aforedescribed types of trailer hitches. Trailer hitch converter assemblies have been used in the past to convert pintle hook hitches to ball-and-socket types. Typically, the prior art converter assemblies comprise an elongated base plate at one end of which the ball member is disposed. Side plates are attached to either side of the base plate which are separated by a width slightly greater than the hook member of the pintle hook hitch. A cylindrical shaft is attached between the side walls and is received within the eyelet formed by the hook and closure member of the pintle hook hitch. In an attempt to prevent yaw and pitch of the converter assembly about the hook, one prior art converter assembly utilizes abutment pads as well as relying on the width of the side walls to prevent the movement of the assembly. Another prior art converter assembly attempts to prevent movement of the converter assembly by abuting the assembly to the frame member of the towing vehicle.

In view of the prior art, it is the purpose of this invention to provide a simple, rather inexpensive, machinable hitch adaptor which can readily be connected to a towing vehicle having a pintle hook hitch to convert the same to a ball-and-socket type. The hitch adaptor is fixedly mounted to the back of the towing vehicle for stability and to prevent rotation thereof during use.

SUMMARY OF THE INVENTION

Accordingly, it is an object of the present invention to provide an improved trailer hitch adaptor to convert a pintle hook hitch to a ball-and-socket type.

Another object of the invention is to provide a trailer hitch adaptor that is relatively inexpensive to manufacture and which can be used to convert a pintle hook hitch to a ball-and-socket type.

In accordance with the foregoing and other objects, there is provided a trailer hitch adaptor suited for converting a pintle hook hitch that is mounted to a towing vehicle into a ball-and-socket type and which includes hook and closure members that form an eyelet when mated. The hitch adaptor comprises a cylindrical bar member that is closely received through the eyelet and a base plate that is affixed along the length of the cylindrical bar and having first and second apertures, the first aperture being centrally located in the base plate to accommodate the hook and closure members of the pintle hook and the second aperture centrally located near the rear of the base plate to receive the ball of the ball-and-socket hitch.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view showing the hitch adaptor of the present invention operatively connected to a pintle hook type hitch;

FIG. 2 is a cross-sectional view of the hitch adaptor of the present invention taken in the directions of lines 2—2 of FIG. 1;

FIG. 3 is a sectional view of the hitch adaptor of the present invention taken in the directions of lines 3—3 of FIG. 1; and FIG. 4 is a top plan view of the trailer hitch adaptor of the present invention.

DETAILED DESCRIPTION OF THE PREFERRED EMBODIMENT

Turning now to the drawings in which like reference characters indicate corresponding elements throughout the several views, there is illustrated hitch adaptor 10 of the present invention. Hitch adaptor 10 is to be utilized to adapt a conventional pintle hook-type hitch 12 for use as a ball-and-socket type. Pintle hook 12 includes a mounting plate 14 which is mounted onto the back of a towing vehicle 16 by the use of threaded bolts 18 and locking nuts 20. Pintle hook 12 is normally used where trailers of heavy weight are to be towed by vehicle 16 and is of conventional construction comprising a closure jaw-like member 22 which is pivotally attached to mounting plate 14 about an axis running parallel with bolt and nut assembly 24. Closure member 22 mates with hook member 26 to form eyelet 28. Closure member 22 is typically latched in a closed position for towing of a trailer by latching arm 30. If pintle hitch 12 only is to be used to tow a trailer, the trailer would be equipped with a towing attachment comprising a ring-eyelet that would fit about hook member 26 as is understood.

It is appreciated that the pintle type hitch described above is not compatible with trailers having a socket type hitch attached to the tow bar thereof. Therefore, the towing vehicle 16, including the pintle hook hitch, could not be used to tow such a trailer. If, for example, the towing vehicle is utilized in a rental business or construction business wherein trailers having different hitch assemblies are used, the towing vehicle could not be used in all cases without some type of converter to convert the pintle hook for use with a ball-and-socket type hitch. In order to convert the pintle hook hitch of the towing vehicle 16 so that it may be used with a ball-and-socket type hitch, adaptor 10, according to the present invention, is utilized.

Hitch adaptor 10 of the embodiment of the invention is shown in FIG. 1 as comprising a base plate 32 that extends directly from and is carried by cylindrical bar member 34. Base plate 32 may be welded to or formed integrally with bar 34 and in general, although not necessarily, is triangular in shape. The outer diameter of bar 34 is sized to fit closely within eyelet 28 of pintle hook 12 through which bar 34 is closely received. Base plate 32 includes a first aperture 36 centrally formed therein to accommodate closure member 22 and hook 26 of pintle hitch 12. A ball element 38 of a ball-and-socket type hitch is mounted at the narrow rear portion of base plate 32. As illustrated, ball element 38 includes a threaded shank portion 40 that is mounted through a second aperture 42 (see FIG. 2) of the base plate 32 and is fastened thereto by nut 44. To provide stability, hitch adaptor 10 includes a pair of bolts 48 traversing through the two bores that are spaced at the two ends of bar 34. Bolts 48 each have a threaded shank 50 which project through sized holes in the rear mounting plate 52 of the towing vehicle 16 and are rigidly held thereto by nuts 54. The bolts prevent rotation of hitch adaptor 10 about the pintle hitch. As illustrated in FIGS. 3 and 4, a sleeve 56 is disposed about each bolt 48 that is positioned about bar 34 and flush mounted against rear mounting plate 52. Each sleeve 56 provides additional strength to the hitch adaptor assembly.

Although not distinctly shown, it should be understood by those skilled in the art that the width W of the rear portion of base plate 32 can be dimensioned so as to accommodate a pin and clevis type hitch. Thus, if ball 38 is removed, base plate 32 can then receive a clevis which is attached to a trailer tow bar in a conventional manner. The pin would be mounted through apertures in the clevis and through the aperture 42 of the base plate 32.

Thus, what has been described above, is a novel trailer hitch adaptor that enables a pintle hook hitch to be converted into a ball-and-socket or a pin and clevis type hitch with all three type hitches being correctly located on the center line of the towing vehicle.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having full described and disclosed the present invention in such clear and concise terms as to enable those skilled in the art to understand and practice the same, the invention claimed is:

1. A hitch adaptor for use in combination with a pintle hook that is mounted to a towing vehicle to convert the pintle hook hitch into a ball-and-socket type, the pintle hook hitch including a hook and closure member that form an eyelet when mated, the hitch adaptor including a cylindrical bar that is closely received through the eyelet, the improvement comprising:

the bar extending beyond the width of the pintle hook hitch;

a base plate mounted along the length of the bar and extending directly therefrom having a first aperture formed centrally therein to accommodate the hook and closure member and a second aperture formed near the rear portion of said base plate to receive a ball member; and mounting means disposed at each end of the bar for affixing the hitch adaptor to the towing vehicle while providing stability and preventing rotation of the hitch adaptor about the pintle hook hitch.

2. The hitch adaptor of claim 1 wherein said mounting means includes:

first and second threaded bolts positioned through respective ends of the bar and a mounting plate of the towing vehicle; and first and second nuts threaded onto said first and second bolts, respectively.

3. The hitch adaptor of claim 2 wherein first and second sleeves are disposed between the bar and said mounting plate about said first and second bolts, respectively.

* * * * *